United States Patent [19]

Miki et al.

[11] Patent Number: 5,040,110
[45] Date of Patent: Aug. 13, 1991

[54] WRITE ONCE READ MANY OPTICAL DISC STORAGE SYSTEM HAVING DIRECTORY FOR STORING VIRTUAL ADDRESS AND CORRESPONDING UP-TO-DATE SECTOR ADDRESS

[75] Inventors: Tadashi Miki; Masayuki Kozuka, both of Osaka, Japan

[73] Assignee: Matsushita Electric Industrial Co., Ltd., Japan

[21] Appl. No.: 263,381

[22] Filed: Oct. 28, 1988

[30] Foreign Application Priority Data

| Oct. 30, 1987 | [JP] | Japan | 62-276110 |
| Oct. 30, 1987 | [JP] | Japan | 62-276111 |
| Oct. 30, 1987 | [JP] | Japan | 62-276137 |
| Jun. 16, 1988 | [JP] | Japan | 63-148570 |

[51] Int. Cl.$^5$ ............ G06F 9/34; G06F 12/10; G11B 7/28; G11B 11/14
[52] U.S. Cl. ............ 364/200; 364/232.5; 364/236.2; 364/236.4; 364/244.6; 364/248.1; 364/249.4; 364/256.4; 364/260.2; 364/262.8; 364/283.1; 369/111
[58] Field of Search ... 364/200 MS File, 900 MS File; 369/32, 111

[56] References Cited

U.S. PATENT DOCUMENTS

| 4,545,044 | 10/1985 | Satoh et al. | 369/32 |
| 4,672,599 | 6/1987 | Geyer et al. | 369/111 |
| 4,682,305 | 7/1987 | Ishikawa | 364/900 |
| 4,945,525 | 7/1990 | Yamamoto et al. | 369/44.12 |

OTHER PUBLICATIONS

"Information Processing—Volume and File Structure of CDROM for Information Interchange", Draft International Standard ISO/DIS 9660 International Organization for Standardization, 1987.

Primary Examiner—Archie E. Williams, Jr.
Assistant Examiner—Emily Y. Chan
Attorney, Agent, or Firm—Lowe, Price, LeBlanc & Becker

[57] ABSTRACT

An information management system for writable optical discs, includes a disc (7) on which data (7a) and management information (7b) are recorded; an operating system (1) in which data in a read only optical disc can be managed by means of files, the operating system (1) having a read instruction (2) and a write instruction (3); read control portion (5) for changing the read instruction directed to the read only optical disc into a read address instruction directed to the disc (7), the read control portion (5) having modifying and loading portion (5b) for changing the management information (7b) into mutual information having a format of the read only optical disc; internal storage (5c) for storing the mutual information; and access changing portion (5d) responsive to the read instruction (2) for switching an access target such that the access target is the disc (7) when the read instruction (2) is directed to the data recorded on the disc (7), and that the access target is the internal storage (5c) when the read instruction (2) is directed to the management information (7b) recorded on the disc (7); and write control portion (6) for renewing the address modifying information in the read control portion (5) in response to the write instruction (3) when new data is written in the disc (7).

12 Claims, 15 Drawing Sheets

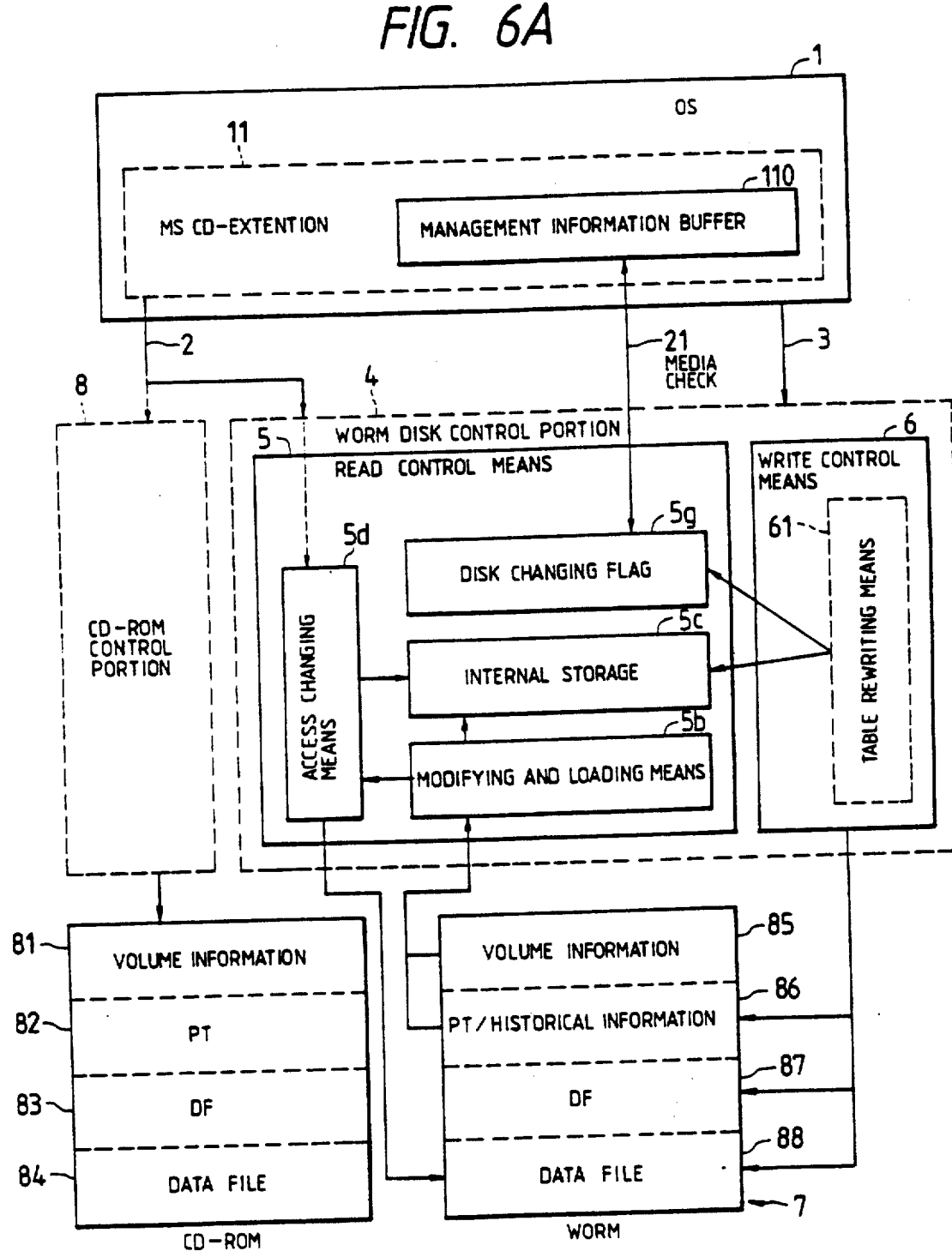

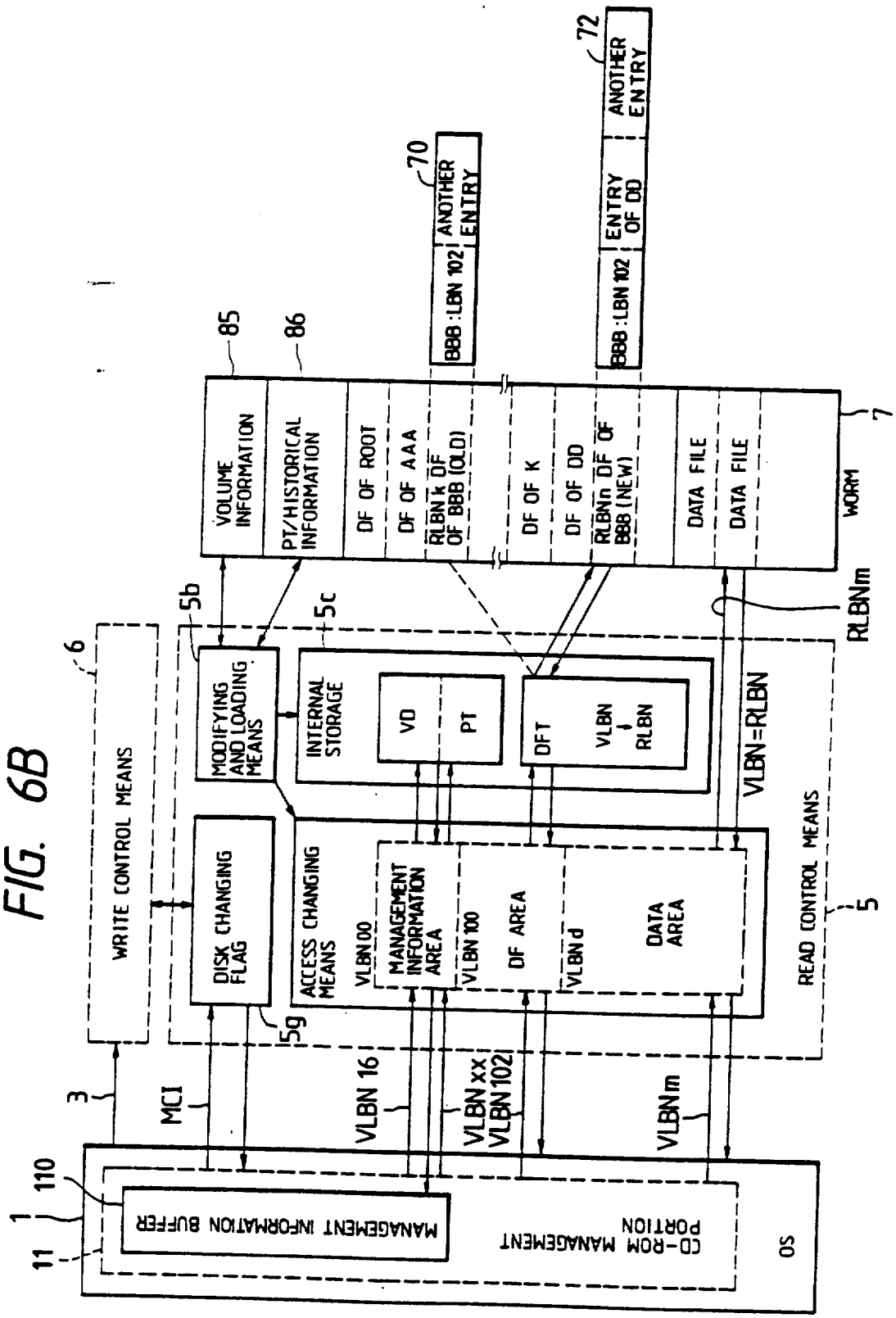

FIG. 7A
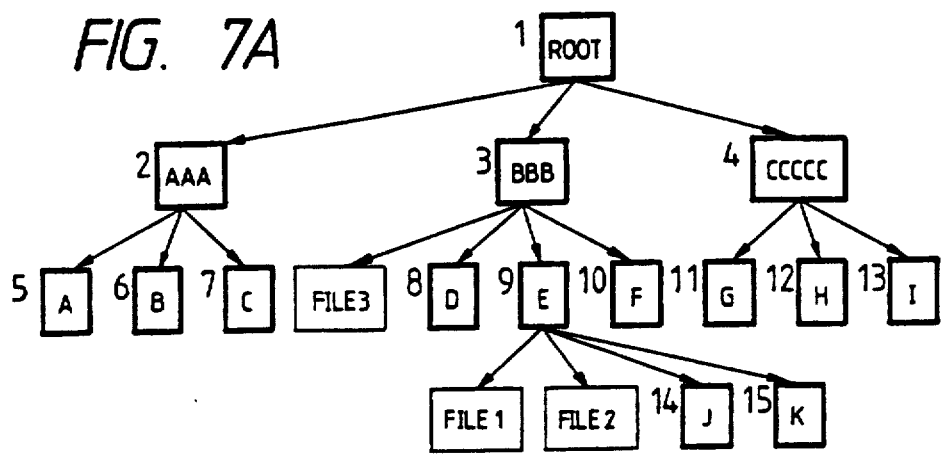
FIG. 7B
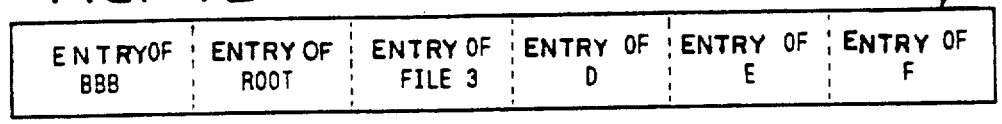
FIG. 7C
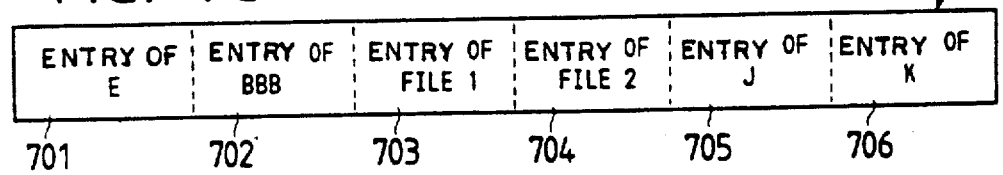
FIG. 7D
| 770 | 771 | 772 | 773 |
|---|---|---|---|
| 4 | 100 | 1 | ROOT |
| 3 | 101 | 1 | AAA |
| 3 | 102 | 1 | BBB |
| 5 | 103 | 1 | CCCCC |
| 1 | 104 | 2 | A |
| 1 | 105 | 2 | B |
| 1 | 106 | 2 | C |
| 1 | 107 | 3 | D |
| 1 | 108 | 3 | E |
| 1 | 109 | 3 | F |
| 1 | 110 | 4 | G |
| 1 | 111 | 4 | H |
| 1 | 112 | 4 | I |
| 1 | 113 | 9 | J |
| 1 | 114 | 9 | K |
FIG. 7E
| 707 | 708 |
|---|---|
| 100 | k−2 |
| 101 | k−1 |
| 102 | k |
| 103 | · |
| 104 | · |
| 105 | · |
| 106 | · |
| 107 | · |
| 108 | · |
| 109 | · |
| 110 | · |
| 111 | · |
| 112 | · |
| 113 | n−3 |
| 114 | n−2 |

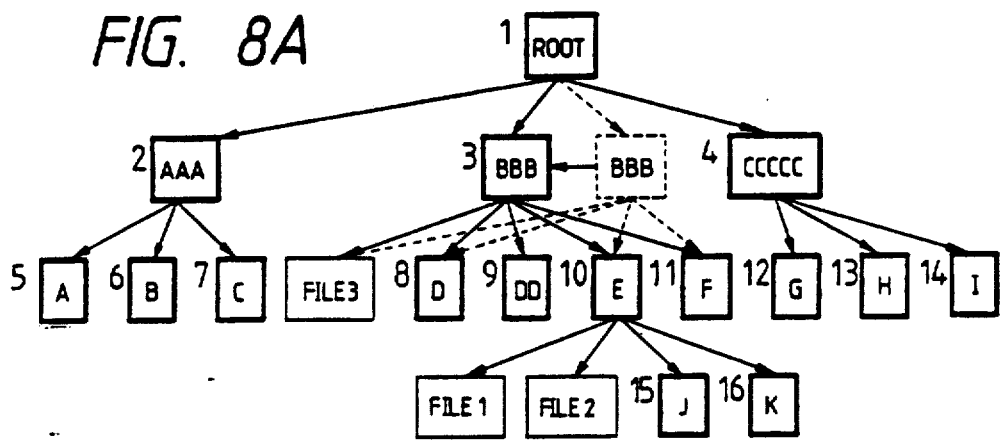

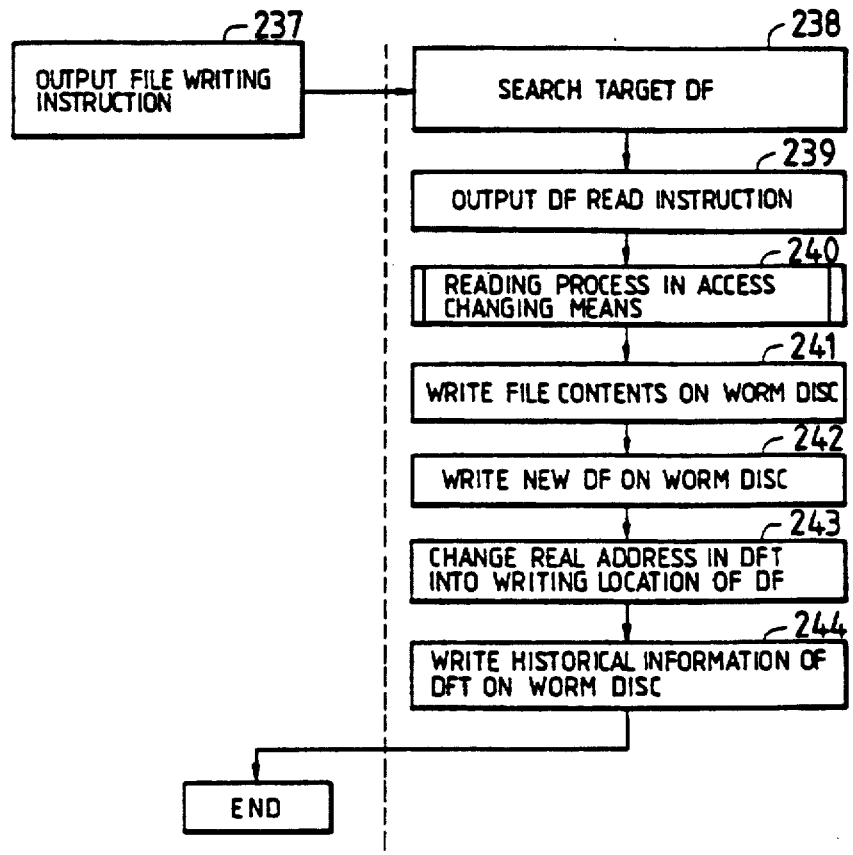
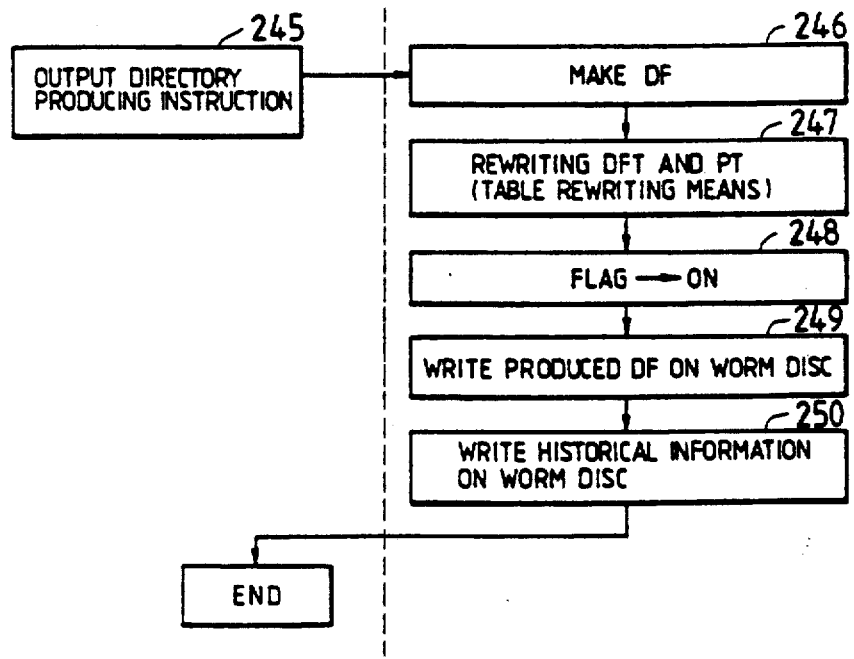

WRITE ONCE READ MANY OPTICAL DISC STORAGE SYSTEM HAVING DIRECTORY FOR STORING VIRTUAL ADDRESS AND CORRESPONDING UP-TO-DATE SECTOR ADDRESS

BACKGROUND OF THE INVENTION

1. Field of the Invention

This invention relates generally to a data processing system, and particularly to an information management system for writable optical compact discs.

2. Prior Art

Recently, compact discs originally developed for recording music have also been used for recording large amounts of information. In a compact disc information management system, a standard format for the file structure of read-only compact discs or CD-ROMs is produced as ISO (International Organization for Standardization) 9660, which is disclosed in "Volume and File Structure of CD-ROM for Information Interchange" ISO 9660, Apr. 1988. However, there is no information management system for writable optical discs. Accordingly, the writable optical discs cannot be managed in a similar manner to an information management system generally used for rewritable magnetic disks, such as floppy disks and hard disks.

SUMMARY OF THE INVENTION

The present invention has been developed in order to present a new and useful standard information management system for writable optical compact discs.

It is, therefore, an object of the present invention to provide a writable optical disc information management system in which writable optical discs can be managed in a similar manner to a rewritable magnetic disk information management system.

In accordance with the present invention there is provided an information management system for writable optical discs, comprising: a disc on which data and management information for the data are recorded; an operating system in which data in a read only optical disc can be managed by means of files, the operating system having a read instruction and a write instruction; read control means responsive to the read instruction for reading the management information and the data from the disc, the read control means including a read address modifying means for changing the read instruction directed to the read only optical disc into a read address instruction directed to the disc by using address modifying information showing a relation between addresses in the management information and real addresses substantially recorded in the disc; and write control means for writing new information on the disc, the write control means including a table rewriting means for renewing the address modifying information in the read control means in response to the write instruction when new data is written in the disc.

In accordance with the present invention there is also provided an information management system for writable optical discs, comprising: a disc on which data and management information for the data are recorded; and operating system in which data in a read only optical disc can be managed by means of files, the operating system having a read instruction and a write instruction; read control means responsive to the read instruction for reading the management information and the data from the disc, the read control means including: modifying and loading means for changing the management information into mutual information having a format of the read only optical disc; internal storage means for storing the mutual information; and access changing means responsive to the read instruction for switching an access target such that the access target is the disc when the read instruction is directed to the data recorded on the disc, and that the access target is the internal storage when the read instruction is directed to the management information recorded on the disc, whereby the read control means changes the read instruction directed to the read only optical disc into a read address instruction directed to the disc by using the mutual information; and write control means for writing new information on the disc and for renewing the address modifying information in the read control means in response to the write instruction when new data is written in the disc.

In accordance with the present invention there is further provided an information management system for writable optical discs, comprising: a disc on which data and management information for the data are recorded; an operating system in which data in a read only optical disc can be managed by means of files, the operating system having a read instruction and a write instruction; read control means responsive to the read instruction for reading the management information and the data from the disc, the read control means including: first modifying and loading means for changing the management information into intermediate information; internal storage means for storing the intermediate information; second modifying and loading means for changing the intermediate information into mutual information having the format of the read only optical disc; and access changing means responsive to the read instruction for switching an access target such that the access target is the disc when the read instruction is directed to the data recorded on the disc, and that the access target is the internal storage when the read instruction is directed to the management information recorded on the disc, whereby the read control means changes the read instruction directed to the read only optical disc into a read address instruction directed to the disc by using the mutual information; and write control means for writing new information on the disc and for renewing the address modifying information in the read control means in response to the write instruction when new data is written in the disc.

BRIEF DESCRIPTION OF THE DRAWINGS

The object and features of the present invention will become more readily apparent from the following detailed description of the preferred embodiments taken in conjuction with the accompanying drawings in which:

FIG. 6a is a detailed block diagram of the information management system of FIG. 5;

FIG. 6b is a block diagram showing a reading process in the information management system of FIG. 5;

FIG. 7A is a block diagram showing a data management system of directories;

FIG. 7B is a directory file of the directory BBB of FIG. 7A;

FIG. 7C is a directory file of a sub directory E of the directory BBB;

FIG. 7D is a path table which is defined by the ISO 9660 format;

FIG. 7E is an example of a directory file address changing table used in the present invention;

FIG. 8A is a directory structure showing a state that a new directory DD is produced as another sub directory of the directory BBB;

FIG. 8B is a directory file showing a state that an entry of the directory DD is added to the directory file of the directory BBB;

FIG. 8C is a path table showing a state that the record of the directory DD is inserted into the path table of FIG. 7D;

FIG. 8D is a directory file address changing table showing a state that the directory file address changing table of FIG. 7E is rewritten in response to the insertion of the directory DD;

FIG. 16 is a flowchart of a program of a file writing process; and

FIG. 17 is a flowchart of a program of a directory renewing process.

The same or corresponding elements and parts are designated at like reference numerals throughout the drawings.

DETAILED DESCRIPTION OF THE INVENTION

In the following description, the information management system for write once read multiple optical discs (WORM discs) will be described as a writable optical disc management system.

Figure 1:
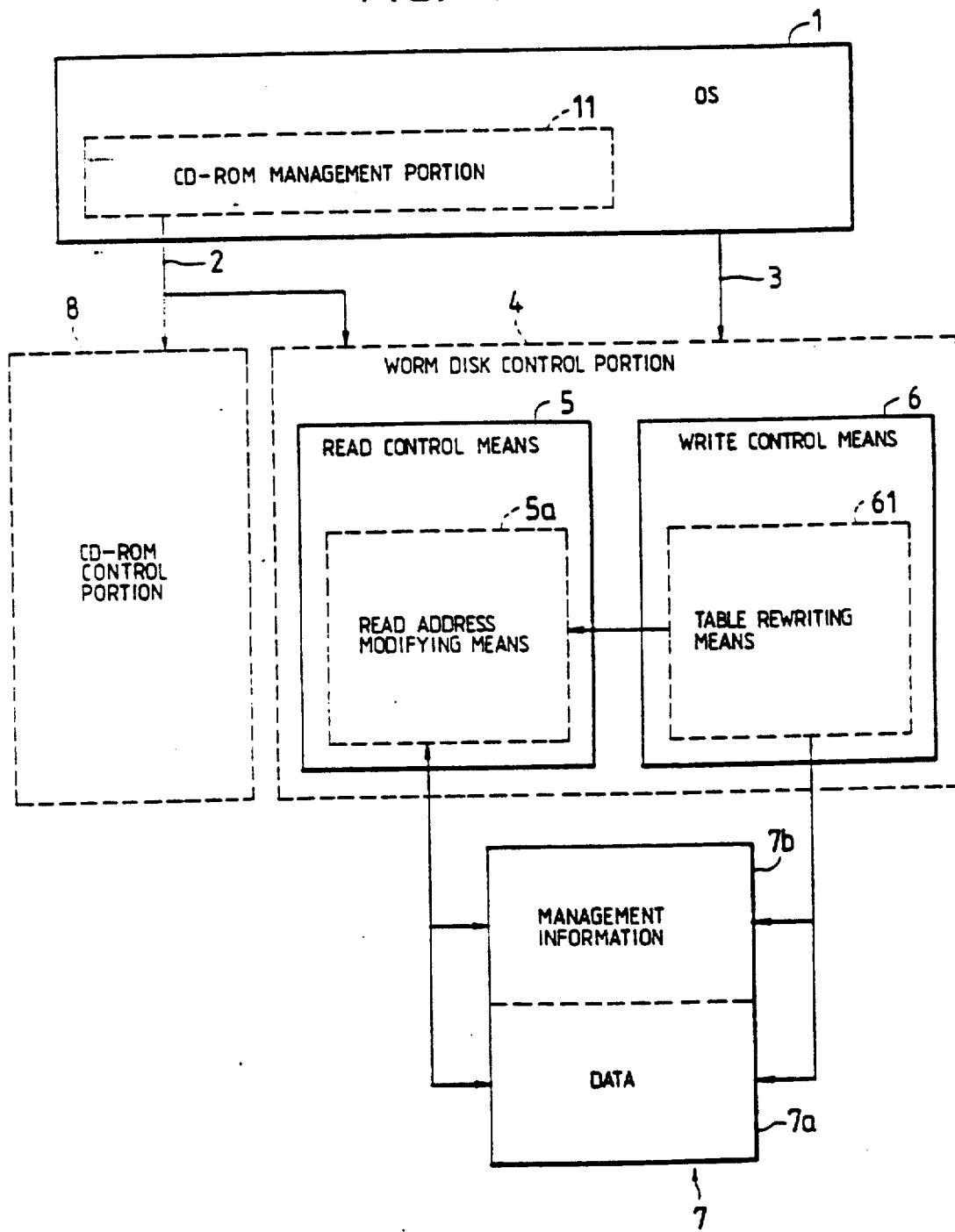
FIG. 1 is a general block diagram of an information management system for writable optical discs according to the present invention.

With reference to FIG. 1, the information management system generally comprises an operating system (OS) 1 in which data in a read only optical disc (CD-ROM) can be managed by means of files, a WORM disc control portion 4 including read control means 5 and write control means 6 having a table rewriting means 61, and WORM disc 7 having data 7a and management information 7b for the data 7a. The OS 1 is a part of the computer system (not shown) having a combination of an input/output port, a CPU, and memories, and an optical disc is used for memory means of the computer system. The OS 1 includes a CD-ROM management portion 11. Usually, a read instruction 2 from the CD-ROM management portion 11 is processed in a CD-ROM control portion 8 to read data out of a CD-ROM. In the WORM disc control portion 4, the WORM information data 7a is treated by the CD-ROM management portion 11 as CD-ROM information data with the function of the CD-ROM control portion 8 being emulated. Therefore, it is not necessary that the CD-ROM management portion 11 determine whether or not the disc is of WORM. As one example of the above-mentioned emulating method, the read control means 5 has read address modifying means 5a for changing a read instruction 2 directed to the CD-ROM into a corresponding read address instruction directed to the WORM disc 7 by using address modifying information which is a table showing a relation between data addresses in the management information 7b and real addresses recorded in the WORM disc 7, and the write control means 6 has address modifying information renewing means 6a for renewing address modifying information in the read address modifying means 5a in accordance with a writing instruction 3 when adding or renewing data.

Figure 2:
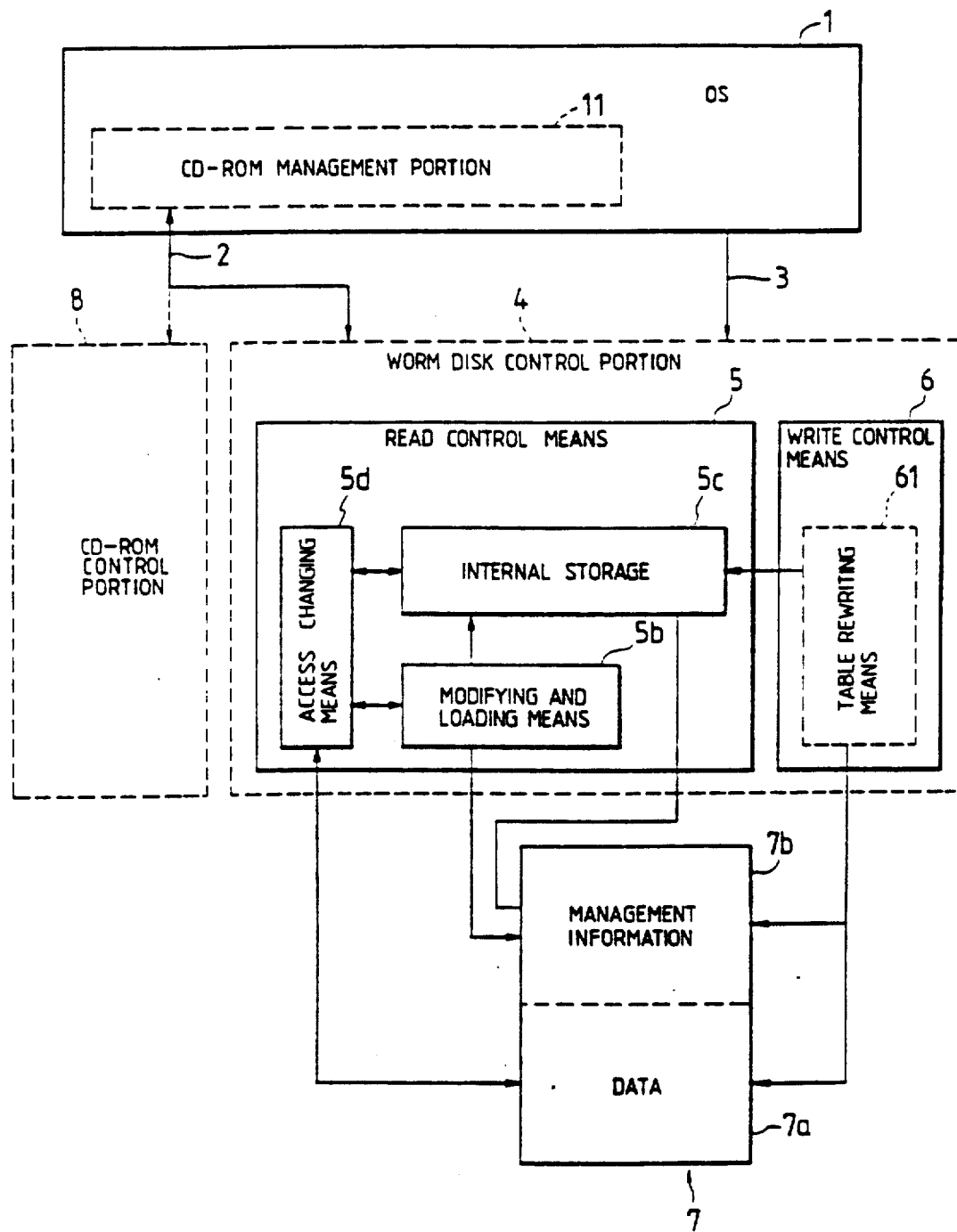
FIG. 2 is a block diagram of the information management system according to a first embodiment of the present invention.

As shown in FIG. 2, the read control means 5 generally includes modifying and loading means 5b for changing the management information 7b into mutual information having a form of CD-ROM, an internal storage 5c for storing the mutual information, and access changing means 5d for switching an access target such that the access target is the WORM disc 7 when the read instruction 2 is directed to the data 7a, and that the access target is the internal storage 5c when the read instruction 2 is directed to the management information 7b. In the modifying and loading means 5b, if the WORM disc 7 is changed or if the OS 1 is initially started, the management information 7b is changed into management information whose format is defined by the CD-ROM management portion 11, e.g. into information of a path table and volume descriptor of ISO 9660, and such changed information is transmitted to the internal storage 5c. In the internal storage 5c, the transmitted information is stored therein. The access switching means 5d determines whether the read instruction 2 is for a WORM disc access or for an internal storage access.

In the case of WORM disc 7, sorted information in the internal storage 5c is not required to be rewritten on the WORM disc 7. In other words, when reading is executed, the sorted information is read from the internal storage 5c without direct reading from the WORM disc 7. When renewing information, historical information showing such changed contents is recorded on the WORM disc 7. After the WORM disc 7 is changed into another disc, the information in the internal storage 5c is changed into information reformed from the historical information. Owing to this internal storage 5c, a shorter reading process can be achieved.

Figure 3:
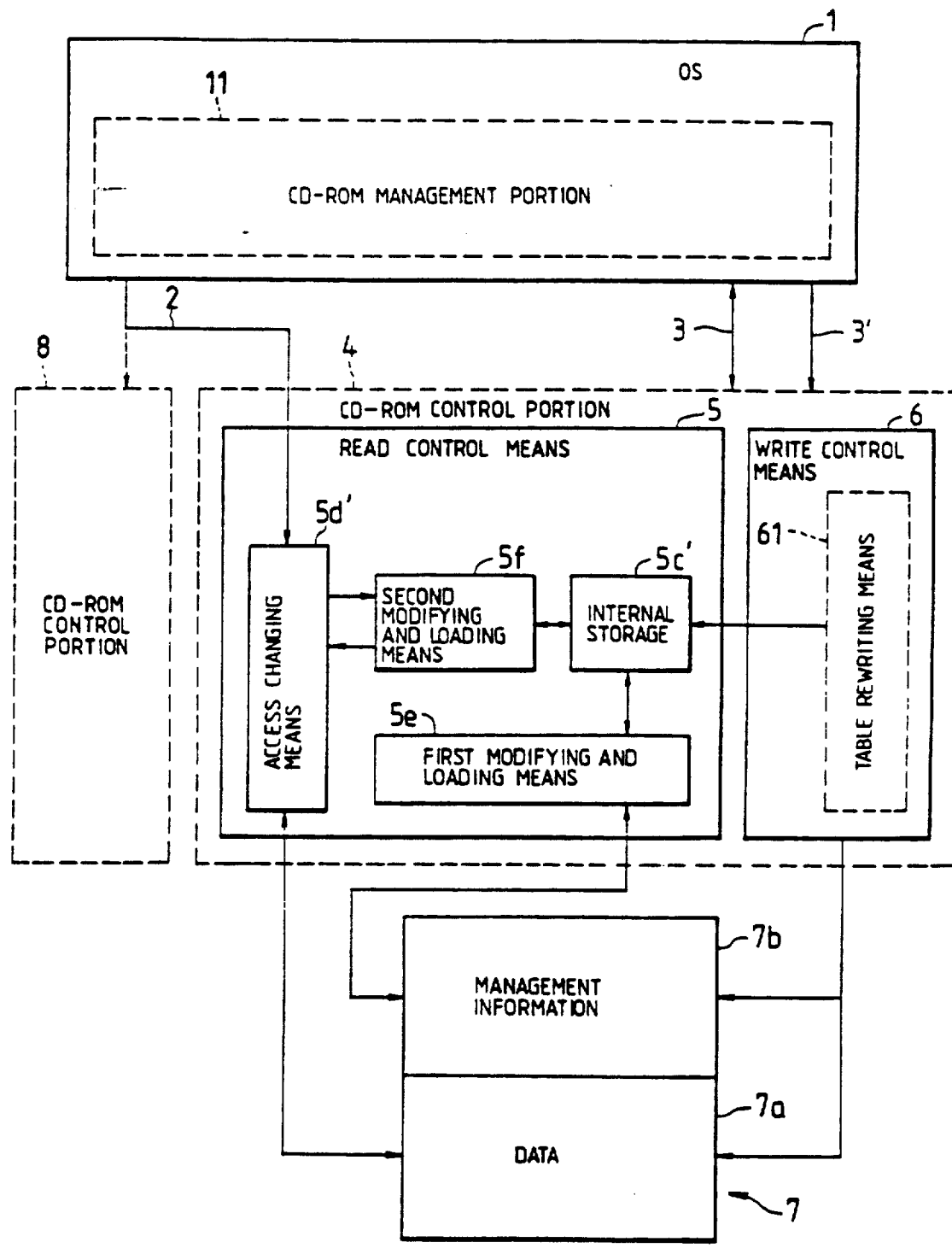
FIG. 3 is a block diagram of the information management system according to a second embodiment of the present invention.

Besides, as shown in FIG. 3, the read control means 5 may include first modifying and loading means 5e, second modifying and loading means 5f, an internal storage 5c', and access switching means 5d'. In the first modifying and loading means 5e, when the WORM disc 7 is changed, or when the OS 1 is initially started, the management information 7b in the WORM disc 7 is changed into intermediate management information to transmit to the internal storage 5c'. In the internal storage 5c', the internal management information is stored therein. In the access switching means 5d', the read instruction 2 is determined as either a WORM disc access or an internal storage access. In the second modifying and loading means 5f, the intermediate management information is changed into management information having a predetermined format. In the CD-ROM management portion 11 of the OS 1, necessary management information such as a path table (PT) is stored therein to achieve high speed data processings.

If the management information in the internal storage 5c is rewritten in a writing process of the WORM disc 7, there is the case that stored management information is different from the management information in the internal storage 5c.

Figure 4:
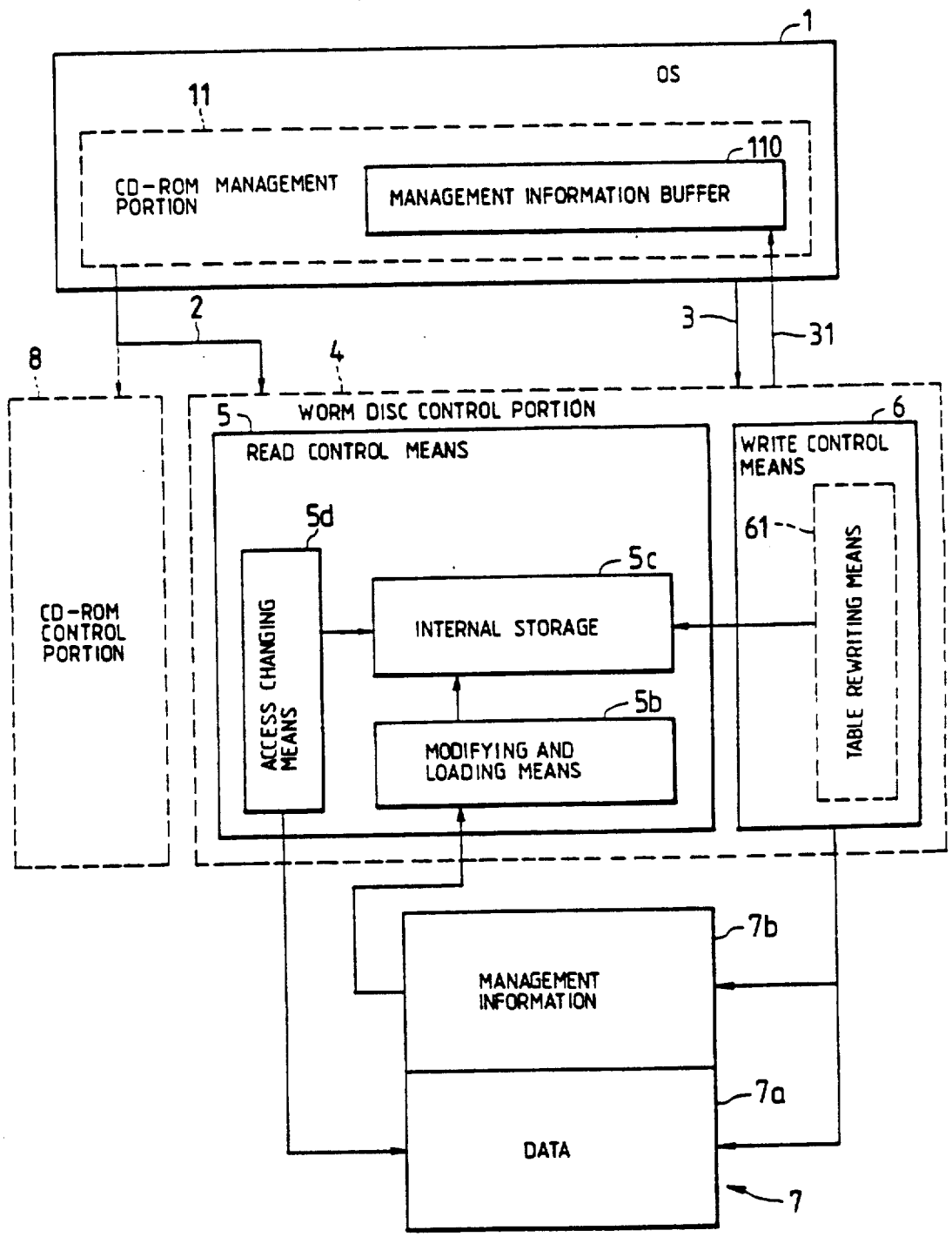
FIG. 4 is a block diagram of the information management system according to a third embodiment of the present invention.

Owing to this, as shown in FIG. 4, the OS 1 have a management information buffer 110 in order to achieve the above-mentioned high speed data processings. The management information which is different from the management information in the internal storage 5c is cleared by a clear interrupting instruction 31 sent from the write control means 6 after the writing process is performed. In the case that the OS 1 does not have any function by which the clear interrupting instruction 31 can be accepted, the read control means 5 may have a disc changing flag 5g as shown in FIG. 5.

Figure 5:
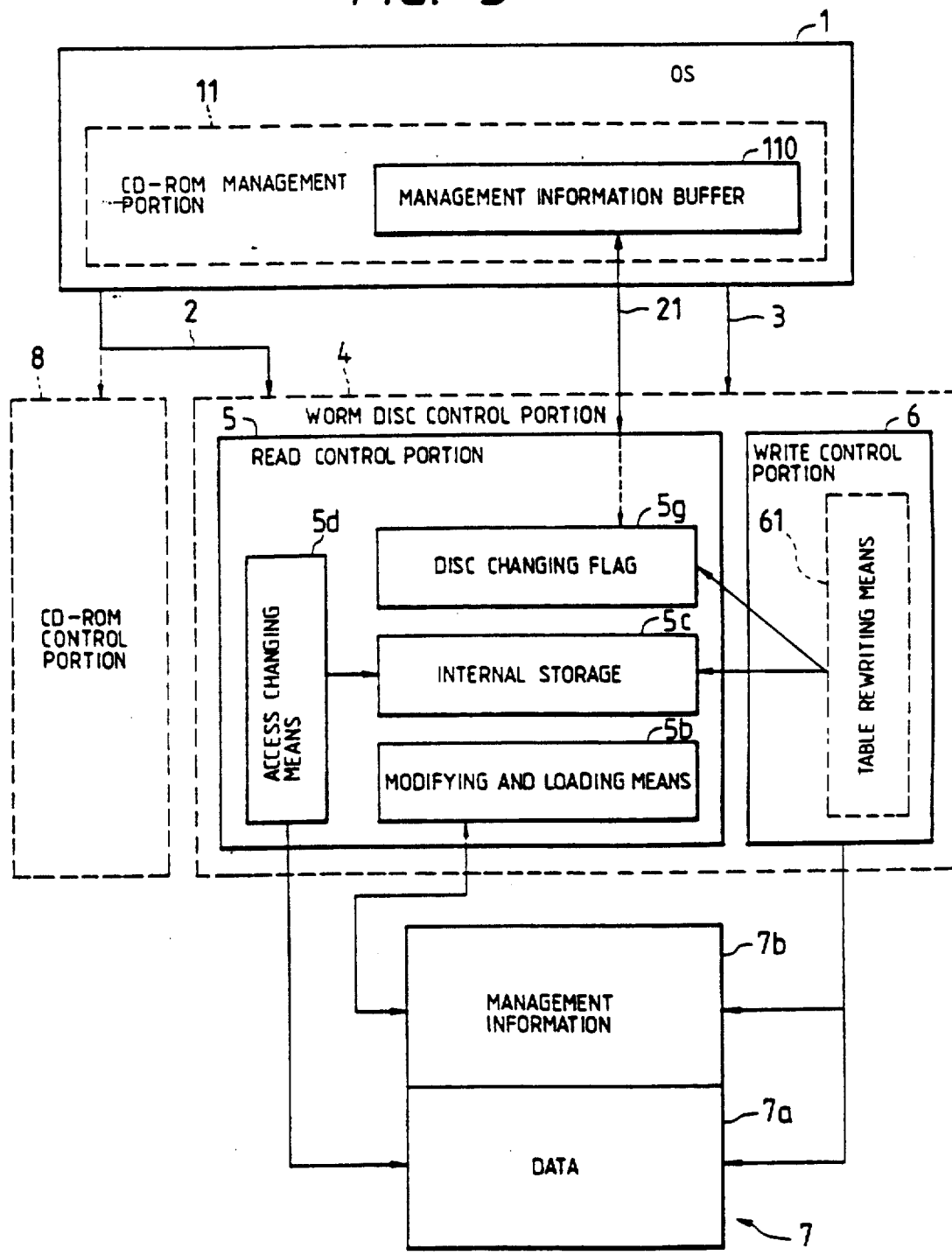
FIG. 5 is a block diagram of the information management system according to the fourth embodiment of the present invention.

In FIG. 5, the disc changing flag 5g is provided for determining whether or not a path table in the internal storage 5c is rewritten. In this case, the CD-ROM management portion 11 of the OS 1 sends a media check instruction 21 as a previous process of information reading to determine whether the disc is changed or not. This is because if the disc is changed, the stored management information in the management information buffer 110 becomes invalid. When the disc is changed, the disc changing flag 5g is standed, i.e. ON state. Meanwhile, when the stored management information is rewritten, the disc changing flag 5g is also standed, and a status 1 showing that the disc is changed is returned to the CD-ROM management portion after the media check instruction 21 is received by the read control means 5. Then, in the management information buffer 110, the information stored therein is cleared, and a new read instruction of new management information is sent to the access switching means 5d. In this case, practically, the disc is not changed, but the management information in the internal storage 5c is merely rewritten.

In the following description, it is assumed that a read only optical disc or CD-ROM 7 is formatted on the basis of the ISO 9660. In the case that this CD-ROM is managed by the CD-ROM management portion 11, it is also assumed that the OS 1 is MS-DOS, that the CD-ROM management portion 11 is MS CD-Extension (MS-DOS extension file system for ISO 9660, Micro Soft Co.), and that the WORM disc control portion 4 is presented by basic input/output system of MS-DOS. FIG. 6a is a detailed block diagram of the information management system of FIG. 5, and FIG. 6b is a block diagram showing a reading process in the information management system of FIG. 5. In the format defined by the ISO 9660, volume information 81, path table 82, directory file 83, and data file 84 are recorded in the CD-ROM. The volume information 81 includes information for the system, volume identifier, and volume descriptor having a location and size information of the path table. In the WORM disc 7, volume information 85 including the volume information 81 and initializing information of the WORM disc, path table information 86 having historical information, directory file 87, and data file 88 are generally recorded. The volume information 85 and the path table information 86 corresponds to the management information in FIG. 5. The directory file 87 and the data file 88 are recorded on the basis of the above-mentioned ISO 9660 format. In FIG. 6b, a numeral 520 denotes volume descriptor (VD) and path table (PT) which are sorted and reformed in the internal storage 5c, and a numeral 521 denotes directory file address changing table (DFT).

Here, prior to describing the reading process in the information management system of FIGS. 6a and 6b of the present invention, directory file (DF) and PT structure and renewing process in the above-mentioned ISO 9660 standard will be described with reference to FIGS. 7A to 11 for a better understanding of the present invention.

FIG. 7A is a block diagram showing a data management system of directories, and ROOT, AAA, BBB, CCCCC, and A to K shows DFs. FILE 1 and FILE 2 are files stored in the directory E, and FILE 3 is a file stored in the directory BBB. FIG. 7B is a DF of the directory BBB in such directory file structure of FIG. 7A, and FIG. 7C is a DF of a sub directory E of the directory BBB. In each of the DFs defined by the ISO 9660 format there are provided entries of the corresponding directories. Each entry is management information having at least a file name, a directory name, recording position, and a file size. For example, as shown in FIG. 7C, the DF of the directory E includes an entry 701 of itself, i.e. the directory E, an entry 702 of the directory BBB, an entry 703 of the FILE 1, an entry 704 of the FILE 2, an entry 705 of the sub directory J, and an entry 706 of the sub directory K.

FIG. 7D is a path table which is defined by the ISO 9660 format, and which is a directory management table showing a reference relation between the directories. The path table has byte-length 770 of directories, DF addresses 771 which are recorded with virtual addresses, parent directory numbers 772 which are shown by numbers 1 to 15 in FIG. 7A, and directory names 773.

FIG. 7E is a DFT used in the present invention. The internal storage 5c has the DFT for changing a virtual address 707 defined in a directory information area into a corresponding real address 708. Since any virtual address 707 can be calculated from the top address, it is not necessary to be record therin. For example, the virtual address of the directory BBB is a logical block number (LBN) 102, this means that the directory BBB is recorded in the real address RLBN k on the WORM disc 7. The OS extension portion 11 reads data on the CD-ROM in every block unit.

FIG. 8A is a directory structure showing a state that a new directory DD is produced as another sub directory of the directory BBB. In this case, an entry of the directory DD is added to the DF of the directory BBB as shown in FIG. 8B, and also the record of the directory DD is inserted into the path table as shown in FIG. 8C. When the new DF of the directory BBB of FIG. 8B is additionally recorded on the WORM disc 7, the real address of previous DF of the directory BBB is changed into the same of new DF of the directory BBB. For example, in FIG. 6B, the real address of the DF of the directory BBB is changed from RLBN k to RLBN n.

Figure 9:
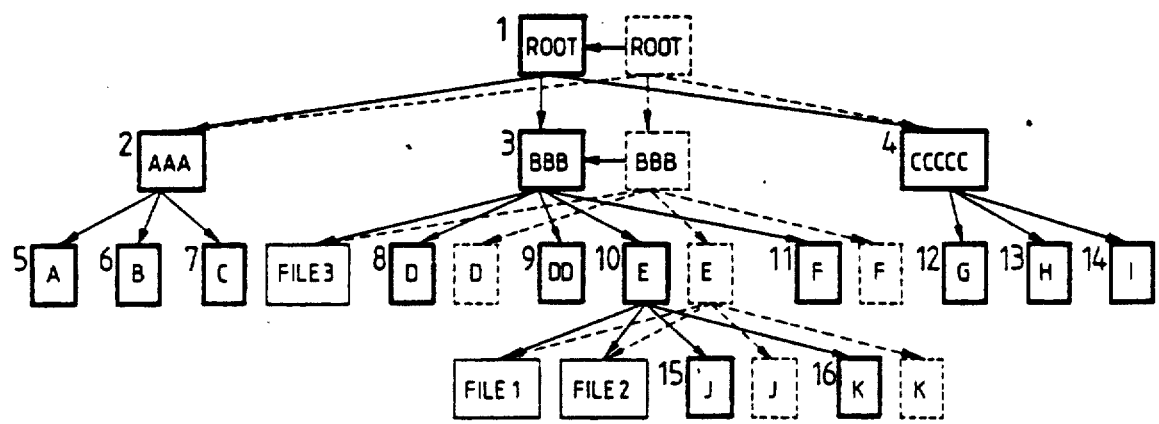
FIG. 9 is a directory structure showing a state that when the directory file of the directory BBB is renewed, the parent directory ROOT, and sub directory D, E, and F must be also renewed in the application of the ISO 9660 standard.

In the application of the ISO 9660 standard, when the DF of the directory BBB is renewed, the parent directory ROOT, and sub directory D, E, and F must be also renewed as shown in FIG. 9. This is because if the real address of the directory BBB is changed with the DF of the directory BBB being additionally recorded on the WORM disc 7, and the entries of the directory BBB in the present directory and sub directories are not changed. Thus, since the DFs of corresponding directories must be sequentially changed due to renewing of only one DF, in the case of a DF having many hierarchies, overhead in such renewing processes becomes so large.

In the present invention, to overcome such a disadvantage of the overhead, the virtual addresses VLBN are determined in the DF, and the DFT is provided for showing a correspondence between the vertual addresses VLBN and the real addresses RLBN. Therefore, if the real addresses are changed, the corresponding DF does not need to be changed, i.e. only the relation in the DFT 521 is renewed as shown in FIG. 8D. For example, when the directory BBB is renewed, only the real address of the DFT 521 is changed from RLBN k to RLBN n. Besides, the PT and DFT stored in the internal storage 5c are directly rewritten by the writing control means 6, and historical information thereof is additionally recorded in the WORM disc 7.

Figure 10:
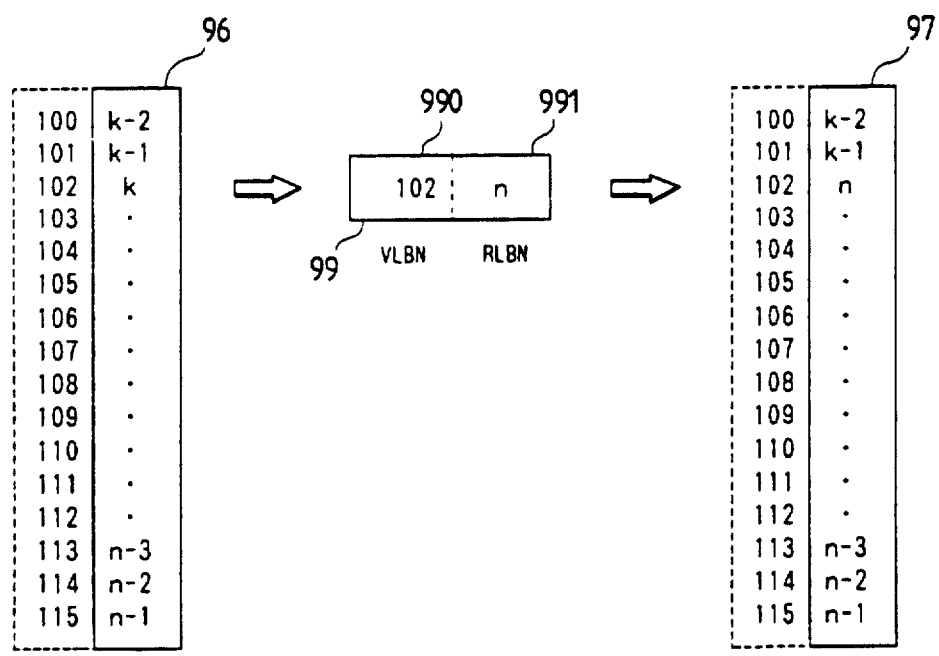
FIG. 10 shows a change of the directory file address changing table and a historical information on renewing this table in the internal storage.
Figure 11:
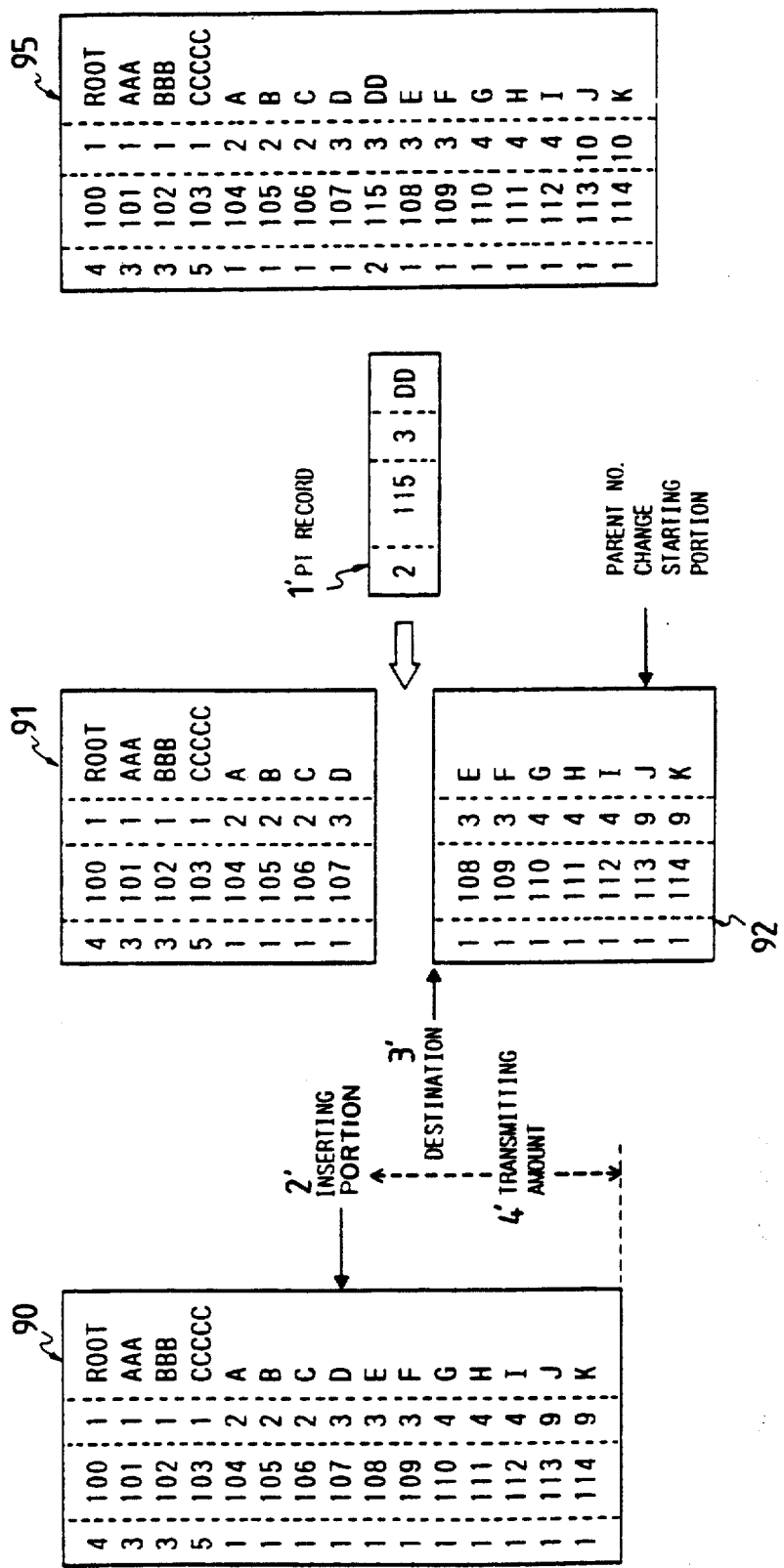
FIG. 11 shows an insertion of a path table record into the path table of FIG. 7D.

FIG. 10 shows a change of the DFT and a historical information on renewing this DFT in the internal storage 5c, and FIG. 11 shows a change of the PT on renewing this PT. In FIG. 10, a numeral 96 denotes a DFT produced after the record of the DD is added to the DFT of FIG. 7E, i.e. a real address RLBN (n−1) of the DD is recorded at the location of a virtual address VLBN 115. A numeral 97 shows a DFT after renewing thereof. A numeral 99 denotes a historical information produced in this renewing process, and this historical information includes a virtual address 990 and a ral address 991. In FIG. 11, a numeral 90 shows a PT before changing, and a numeral 95 shows a PT after changed. When a PT record 1' of the directory DD is inserted between a portion 91 placed higher than an insert portion 2' of the PT 90 and a portion 92 placed lower than the same, the lower portion 92 corresponding to a relocation amount 4' is relocated to a destination 3' by the same record amount as the PT record 1', and the PT record 1' is inserted therebetween. At this time, the parent directory numbers of the directories J and K are also changed so that these parent directory numbers are increased by one from a parent directory number increment starting portion 5'. Therefore, the historical information 99 is necessary to include at least the PT record 1' which is to be inserted, the insert portion 2' in which the PT record 1' is inserted, the destination 3', the relocation amount 4' of information which is to be relocated, and the parent directory number increment starting portion 5'.

Thus, the information amount of historical information is formed of approximately tons of bytes. Since information is generally recorded on the WORM disc 7 every hundreds of bytes in a physical sector, a virtual address of a DF which is to be subsequently produced and an area information indicating the top address of unused area in the WORM disc 7 can be also recorded in the remaining area thereof.

When a file is renewed, the real address of the corresponding DF is changed by renewing the DF. However, since the corresponding DFT stored in the internal storage 5c is rewritten and the historical information is recorded on the WORM disc 7, any change of the PT is not required.

Figure 12:
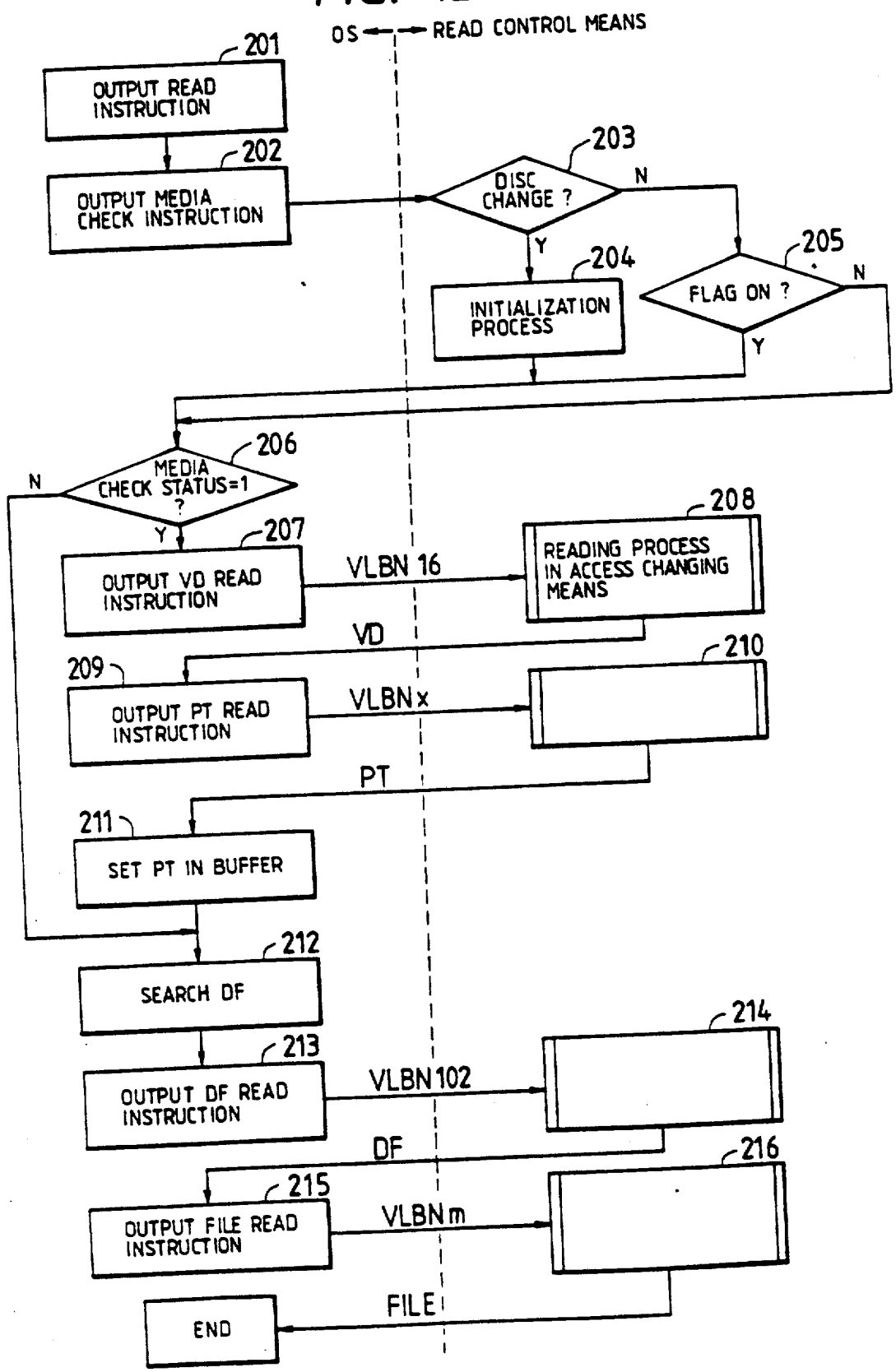
FIG. 12 is a flowchart of a program of a file reading process.

The operation of the information management system for writable optical discs according to the present invention will be described hereinbelow with reference to FIGS. 12 to 17. FIG. 12 is a flowchart of a program of a file reading process. In a first step 201 of this flowchart, a file read instruction is outputted to the OS management portion 11 from the OS 1. In a step 202 following the step 201, a media check instruction MCI is sent to the read control means 5 from the OS management portion 11. In a step 203 following the step 202, read control means 6 determines whether a disc 7 is changed or not. When the disc 7 is changed, the program advances to a step 204. When the disc is not changed, the program advances to a step 205. In the step 204, an initialization process is performed.

Figure 13:
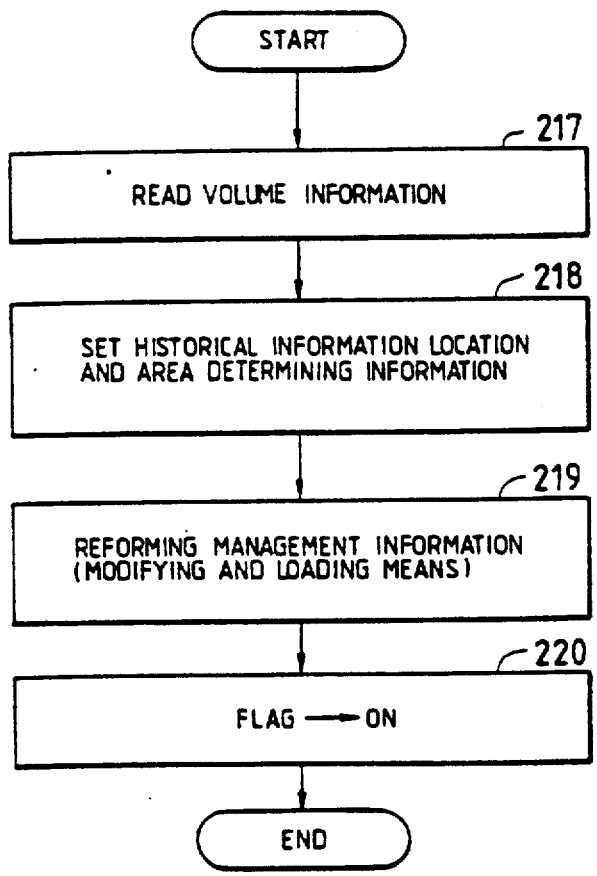
FIG. 13 is a flowchart of a program of an initialization process.

FIG. 13 is a flowchart of a program of an initialization process. In a first step 217 of FIG. 13, a volume information 85 is read out of a predetermined address in the WORM 7. In a step 218 following the step 217, a locaton of historical information, and an area determining information indicative of a condition for the determination of the area in the access changing means 5d, are defined. In the step 219 following the step 218, desired management information is reformed in the internal storage 5c with historical information in the WORM disc 7 being read out therefrom. The process of the step 219 is performed in the modifying and loading means 5b of FIG. 2 or the first modifying and loading means 5e of FIG. 3. In FIG. 3, the management information is of intermediate type. Finally, in the step 220 following the step 219, the disc changing flag 5g is standed, the program advances to a step 206.

Meanwhile, in the step 205 following the step 203, it is determined whether the disc changing flag 5g is stand (ON-state) or not (OFF-state). When the disc changing flag 5g is in ON-state, signal status "1" is sent to the OS 1, and the program advances to the step 206. When the disc changing flag 5g is in OFF-state, signal status "0" is sent to the OS 1, and the program advances to the step 206. Thus, the steps 203, 204 and 205 are forms a media check means.

In the step 206, it is determined whether the signal status of the media check resultant is "1" or "0". When the signal status is "1", the program advances to a step 207. When the signal status is "0", the program advances to a step 212. In the step 207 following the step 206, the OS extension portion 11 sends a VD read instruction to the access changing means 5d, and the program advances to a step 208. In the step 208, an access changing process of the access changing means 5d is performed.

Figure 14:
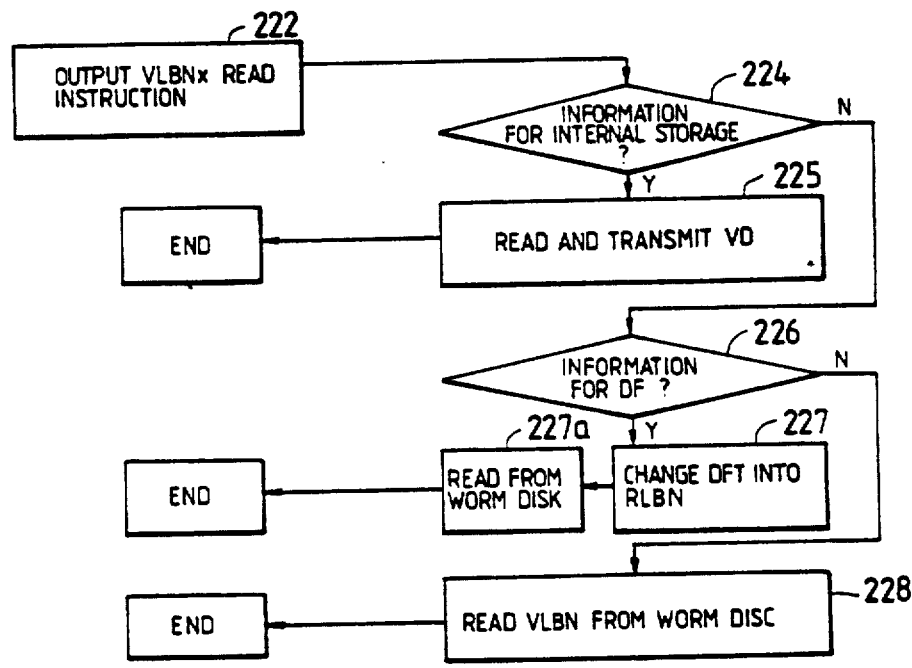
FIG. 14 is a flowchart of an access changing process in the information management system of FIG. 2.

FIG. 14 is a flowchart of an access changing process in the information management system of FIG. 2. In a first step 222 of the FIG. 14, VLBN x is sent from the OS-extention portion 11·to the access changing means 5d. In the step 224 following the step 222, it is determined whether or not the VLBN x is an access directed to the internal storage 5c on the basis of the area determining information defined by the above-mentioned initializing process. For example, in the FIG. 6b, the first VLBN x shows VLBN 16, and the area determining information shows addresses from VLBN 00 to VLBN (d−1). When the VLBN x is directed to the internal storage 5c, the program advances to a step 225. When the VLBN x is not directed to the internal storage 5c, the program advances to a step 226. In the step 225, the VD reformed and stored in the internal storage 5c by initializing process is read out to be transmit to the OS 1. In the step 226 following the step 224, it is determined whether or not the VLBN x is an access directed to the DF, i.e. to WORM disc 7. When the VLBN x is directed to the DF, the program advances to a step 227. When the VLBN x is not directed to the DF, the program advances to a step 228. In the step 227 following the step 226, the VLBN x is changed into a corresponding RLBN x with reference to the DFT in the internal storage 5c. Then, in a step 227a following the step 227, the RLBN x is read out of the WORM disc 7. In the step 228 following the step 226, the VLBN x is read out of the WORM disc 7 because the addresses of the data area is the same as that of the WORM disc 7.

Figure 15:
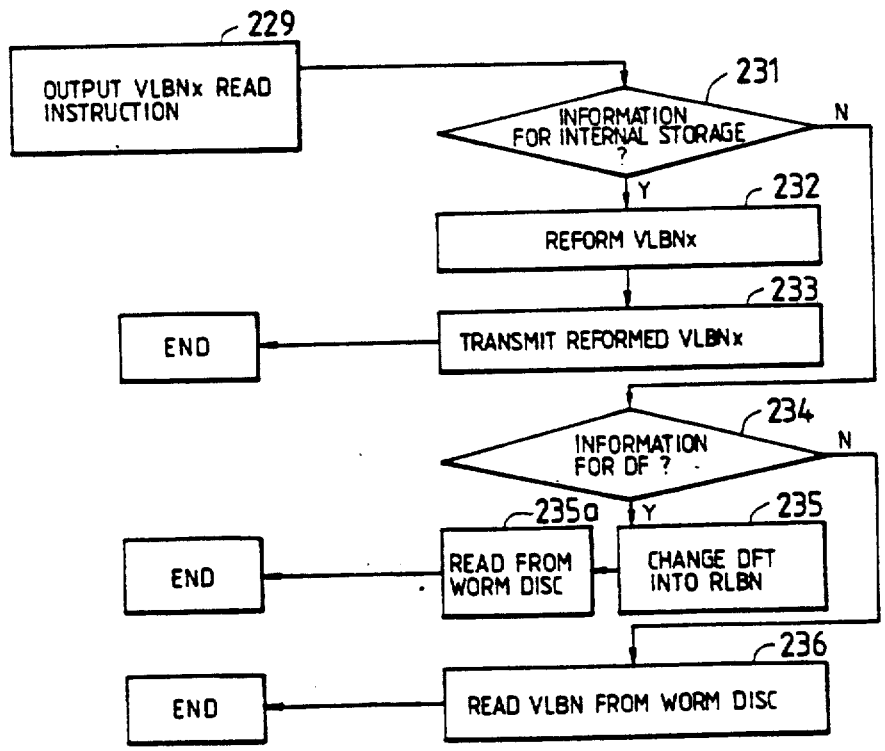
FIG. 15 is a flowchart of an access changing process in the information management system of FIG. 3.

FIG. 15 is a flowchart of an access changing process in the information management system of FIG. 3. In a first step 229 of the FIG. 15, VLBN x is sent from the OS-extension portion 11 to the access changing means 5d'. In the step 231 following the step 229, it is determined whether or not the VLBN x is an access directed to the internal storage 5c' on the basis of the area determining information defined by the above-mentioned initializing process. When the VLBN x is directed to the internal storage 5c', the program advances to a step 232. When the VLBN x is not directed to the internal storage 5c', the program advances to a step 234.

In the step 232, a VLBN x is reformed from the intermediate management information stored in the internal storage 5c'. In a step 233 following the step 232, the reformed VLBN x is transmitted to the OS 1. The steps 232 and 233 are performed in the second modifying and loading portion 5f. In the step 234 following the step 231, it is determined whether or not the VLBN x is an access directed to the DF, i.e. to WORM disc 7. When the VLBN x is directed to the DF, the program advances to a step 235. When the VLBN x is not directed to the DF, the program advances to a step 236. In the step 235 following the step 234, the VLBN x is changed into a corresponding RLBN x with reference to the DFT in the internal storage 5c'. Then, in a step 235a following the step 235, the RLBN x is read out of the WORM disc 7. In the step 236 following the step 234, the VLBN x is read out of the WORM disc 7 because the addresses of the data area is the same as that of the WORM disc 7.

Turning to FIG. 12, in a step 209 following the step 208, a PT read instruction derived from a location information in the VD is sent to the access changing means 5d, and the program advances to a step 210. For instance, in FIG. 6B, the PT read instruction is VLBN xx. The step 210 has the same function as the step 208. In the step 210, a PT reformed in the internal storage 5c is read out to transmit to the OS 1. In a step 211 following the step 210, the contents of the PT derived from the step 210 is stored in the management information buffer 110 in the OS 1. In FIGS. 6A and 6B, the read instruction 2 is sent to the CD-ROM control portion 8 to merely read out the corresponding VLBN x. In the read control portion 5, it is determined whether the read instruction 2 is an access directed to an address of the management information area, e.g. an address from VLBN 00 to VLBN 99, an access directed to an address of the DF area, e.g. an address from VLBN 100 to VLBN (d−1), or an address of the data area, e.g. an access directed to an address from VLBN d to the last. When the access is directed to the management information, the address of the management information stored in the internal storage 5c is read out. When the access is directed to the data, the address of the RLBN m on the WORM disc 7 is read out.

In the step 212 following the step 211 or the step 206, the DF of the desired file is searched by using the PT stored in the management information buffer 110. In a step 213 following the step 212, a DF read instruction derived from a location information in the PT is sent to the access changing means 5d, and the program advances to a step 214. For example, in the case that the FILE 3 of the directory BBB of FIG. 8B is read out, a PT read instruction VLBN 102 is outputted to the access changing means 5d, and the VLBN 102 is determined as an instruction directed to the sector in the DF by the access changing means 5d. Since the step 214 has the same function as the step 208, in the step 227 of the step 214, the VLBN 102 is changed into the RLBN n by the DPT 521. Then, in the step 227a, the DF of the BBB is read out from the WORM disc 7. In a step 215 following the step 214, file read instruction VLBN m is outputted to the access changing means 5d, and the program advances to a step 216. Since the step 216 has the same function as the step 208, the desired file is outputted by the step 216, i.e. in the OS extension portion 11, the location (VLBN m) and size of the FILE 3 are determined by using the entry of the FILE 3 in the DF of the read out BBB, and the file read instruction is outputted to the access changing means 5d. Then, the FILE 3 is read out by the step 228 in the step 216.

FIG. 16 is a flowchart of a program of a file writing process. In a first step 237 of this flowchart, a file write instruction 3 is outputted to the write control means 6 from the OS 1. In a step 238 following the step 237, a target DF is searched from the management information in the internal storage 5c. In a step 239 following the step 238, a DF read instruction is outputted to the read control means 5. In a step 240 following to the step 239, the same read processing as the step 208 in FIG. 12 is performed. Then, in a step 241 following the step 240, the contents of the DF is additionally recorded on the WORM disc 7. In a step 242 following the step 241, the DF is also recorded after the DF is renewed. In a step 243 following the step 242, the real address of the DFT in the internal storage 5c is changed into the address of newly added DF. This step 243 is performed in the table rewriting means 61. In the step 244 following the step 243, the historical information of the DFT is recorded on the WORM disc 7.

FIG. 17 is a flowchart of a program of a directory renewing process. In a first step 245 of this flowchart, a directory producing instruction 3' is outputted to the write control means 6 from the OS 1. In a step 246 following the step 245, a DF of the directory to be produced is made. In a step 247 following the step 246, the DFT and the PT in the internal storage 5c are rewritten. For example, in the case that the new directory DD is added to the BBB as shown in FIG. 8A, the DFT of FIG. 7E is rewritten to the DFT of FIG. 8D, and the PT of FIG. 7D is rewritten to the PT of FIG. 8C. This step 247 is performed in the table rewriting means 61. In a step 248 following the step 247, the disc changing flag 5g is standed. In the step 249 following the step 248, such newly produced DF is recorded on the WORM disc 7. Finally, in a step 250 following the step 249, the historical information of the new DF is also recorded on the WORM disc 7.

At this time, since the OS extension portion 11 operating as a CD-ROM management portion has no writing function, it is required that the writing process therefor is programed in the OS 1 or the write control means 6.

As will be understood from the above description, since it is of no relation to the information management system of the invention whether the using disc is CD-ROM or WORM disc, WORM disc can be used in the same manner as the CD-ROM having the ISO 9660 format.

If the amount of the historical information is large, since the reforming time of historical information becomes long, in order to achieve high speed processings, the corresponding PT in the internal storage 5c may be recorded on the WORM disc 7 when a constant amount of the historical information is produced, or when the WORM disc is changed.

Besides, in order to save the recording area of the WORM disc 7, a mapping table in which the real address is put together in every predetermined amount of the real addresses may be produced in the WORM disc 7. For example, the mapping table is formed 100 blocks of the real address as one page. For instance, in the data location of the WORM disc 7 of FIG. 6B, although partitions are provided in every predetermined interval, the interval does not always meet with the amount of information. However, if a page location in the WORM disc 7 is recorded in the mapping table, the recording area can be efficiently used.

In addition, in the present invention, although the ISO 9660 format is used in the OS extension portion 11 for the description of the present invention, the CD-ROM information management portion may be made on the basis of another format.

The above-described embodiments are just examples of the present invention, and therefore, it will be apparent for those skilled in the art that many modifications and variations may be made without departing from the scope of the present invention.

What is claimed is:

1. An information management system for writable optical discs, comprising:
   (a) a disc driving means for driving a disc on which data and management information for said data are recorded;
   (b) an operating system for managing, in units of files, data recorded in said disc with a format of a read only optical disc, said operating system having a read instruction;
   (c) write control means for writing new information on one or more virgin sectors of said disc in response to a write instruction for writing in one or more prewritten sectors given from a program which runs on said operating system, and for writing or rewriting address modifying information on said disc, said address modifying information showing a relationship between addresses of said prewritten sectors and addresses of said virgin sectors on which said new information has been written; and
   (d) read control means responsive to said read instruction for reading information prewritten on said disc using said address modifying information with an instruction for reading out data from one or more of said prewritten sectors being changed into an instruction for reading out data from one or more of said virgin sectors on which said new information has been written,
   wherein said read control means includes internal storage means for storing transposition information obtained from said management information and having a format of said read only optical disc and said management information comprises one or more directory files which manage information of one or more files and said internal storage has a directory file address changing table used for changing a virtual address whose area is defined beforehand by said management information into a corresponding read address of said virgin sectors on which latest directory files have been written by said write control means.

2. An information management system as claimed in claim 1, wherein said format of a read only optical disc is ISO 9660 format.

3. An information management system for writable optical discs, comprising:
   (a) a disc driving means for driving a disc on which data and management information for said data are recorded;
   (b) an operating system for managing, in units of files, data recorded in said disc with a format of a read only optical disc, said operating system having a read instruction;
   (c) write control means for writing new information on one or more virgin sectors of said disc in response to a write instruction for writing in one or more prewritten sectors given from a program which runs on said operating system, and for writing or rewriting address modifying information on said disc, said address modifying information showing a relationship between addresses of said prewritten sectors and addresses of said virgin sectors on which said new information has been written; and
   (d) read control means responsive to said read instruction for reading said management information and said data from said disc, said read control means including:
      (i) modifying and loading means for changing said management information into transposition information having a format of said read only optical disc;
      (ii) internal storage means for storing said transposition information; and
      (iii) access changing means responsive to said read instruction for switching an access target such that said access target is said disc when said read instruction is directed to said data recorded on said disc, and that said access target is said internal storage when said read instruction is directed to said management information recorded on said disc, whereby said read control means changes said read instruction directed to said read only optical disc into a read address instruction directed to said disc by using said transposition information,
   wherein said management information comprises one or more directory files which manage information of one or more files and said internal storage has a directory file address changing table used for changing a virtual address whose area is defined beforehand by said management information into a corresponding read address of said virgin sectors on which latest directory files have been written by said write control means.

4. An information management system as claimed in claim 3, wherein said format of a read only optical disc is ISO 9660 format.

5. An information management system as claimed in claim 3, wherein when new directory file is added, a real address in said directory file address changing table is changed into an address corresponding to addresses of sectors to which said new directory file is added by said write control means.

6. An information management system as claimed in claim 3, wherein said operation system has a management information buffer means for storing management information showing a relation between addresses of one or more directory files.

7. An information management system as claimed in claim 6, wherein said management information stored in said management information buffer is cleared by said write control means after said new data is written in said disc.

8. An information management system for writable optical discs, comprising:
 (a) a disc driving means for driving a disc on which data and management information for said data are recorded;
 (b) an operating system for managing, in units of files, data recorded in said disc with a format of a read only optical disc, said operating system having a read instruction;
 (c) write control means for writing new information on one or more virgin sectors of said disc in response to a write instruction for writing in one or more prewritten sectors given from a program which runs on said operating system, and for writing or rewriting address modifying information on said disc, said address modifying information showing a relationship between an address of at least one of said prewritten sectors and an address of at least one of said virgin sectors on which said new information has been written; and
 (d) read control means responsive to said read instruction for reading said management information and said data from said disc, said read control means including:
  (i) first modifying and loading means for changing said management information by using said address modifying information into intermediate information having less information than transposition information having a format of said read only optical disc;
  (ii) internal storage means for storing said intermediate information;
  (iii) second modifying and loading means for changing said intermediate information into said transposition information having said format of said read only optical disc; and
  (iv) access changing means responsive to said read instruction for switching an access target such that said access target is said disc when said read instruction is directed to said data recorded on said disc, and that said access target is said internal storage when said read instruction is directed to said management information recorded on said disc, whereby said read control means changes said read instruction directed to said read only optical disc into a read address instruction directed to said disc by using said transposition information,
 wherein said management information comprises one or more directory files which manage information of one or more files and said internal storage has a directory file address changing table used for changing a virtual address whose area is defined beforehand by said management information into a corresponding real address of said virgin sectors on which latest directory files have been written by said write control means.

9. An information management system as claimed in claim 8, wherein said format of a read only optical disc is ISO 9660 format.

10. An information management system as claimed in claim 8, wherein when new directory file is added, a real address in said directory file address changing table is changed into an address corresponding to addresses of sectors to which said new directory file is added by said write control means.

11. An information management system as claimed in claim 8, wherein said operating system has a management information buffer means for storing a portion of said management information showing a relation between address of one or more directory files.

12. An information management system as claimed in claim 11, wherein said management information stored in said management information buffer is cleared by said write control means after said new data is written in said disc.

* * * * *